Feb. 20, 1951
J. F. NELSON ET AL
2,542,559
TREATMENT OF ISOBUTYLENE POLYMER
SLURRY TO ENLARGE PARTICLE SIZE
Filed April 6, 1946
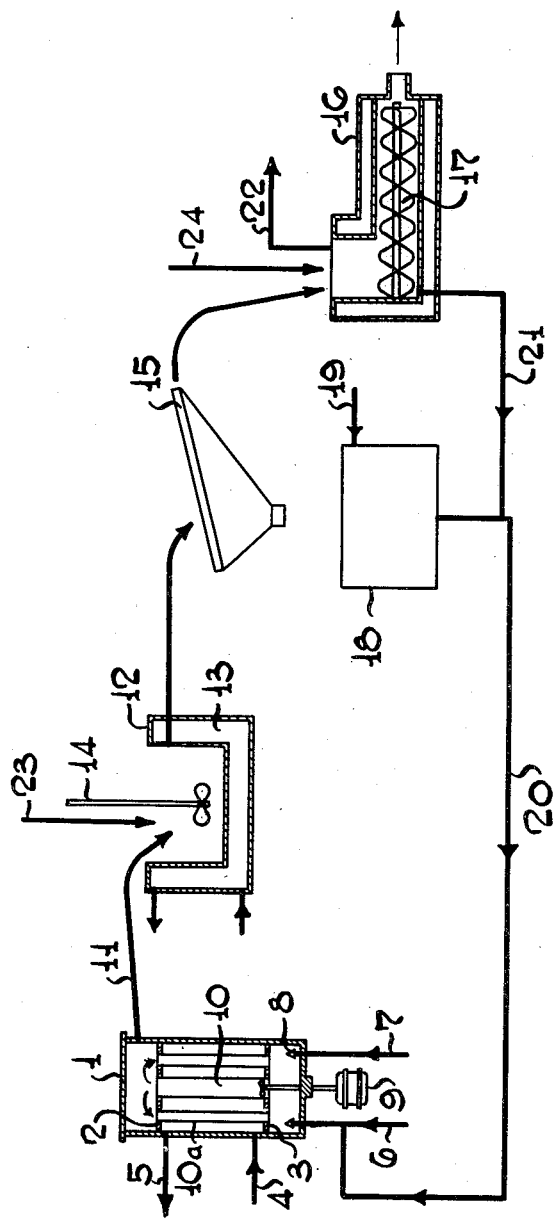
Joseph F. Nelson
Bruce R. Tegge   Inventors
By JCSmall Attorney Patented Feb. 20, 1951

2,542,559

UNITED STATES PATENT OFFICE 2,542,559

TREATMENT OF ISOBUTYLENE POLYMER SLURRY TO ENLARGE PARTICLE SIZE

Joseph F. Nelson, Clark Township, Union County, and Bruce R. Tegge, Roselle, N. J., assignors to Standard Oil Development Company, a corporation of Delaware Application April 6, 1946, Serial No. 660,020

5 Claims. (Cl. 260—853)

1

This invention relates to the low temperature polymerization of olefinic material and relates more particularly to a method for effecting dry recovery of the polymerized material.

It has been found possible to polymerize olefinic material such as the iso-olefins, especially isobutylene, either alone or in admixture with a polyolefin such as butadiene, isoprene, piperylene and the like, at temperatures ranging from about 0° C. to −40° C. down to −127° C. or lower to −164° C.; to yield a high molecular weight rubbery polymer which when prepared from a mixture of an iso-olefin and a diolefin is reactive with sulfur and other curing agents in a curing reaction to yield a material having a good tensile strength ranging from 1000 to 4600 pounds per square inch and an elongation at break ranging from 200% or 400% to 1200%. This reaction uses a Friedel-Crafts type catalyst, preferably in solution in a low-freezing, non-complex forming solvent; aluminum chloride dissolved in ethyl or methyl chloride or methylene chloride being particularly useful. The polymerization and preparation of the polymer, which has previously been conducted by batch methods, is difficult because of the fact that the polymer is obtained as particles which at higher temperatures and during the polymerization tend to coagulate into a solid mass which is difficult to remove from a reactor and difficult to handle.

If low temperatures are maintained, the polymer is obtained as a slurry of dispersed particles which show little or no tedency to coalesce.

In the past this polymer has been recovered from the reaction slurry by contacting the slurry with agitated hot water. This wet process involves several problems. The polymer must be slurried in the water, separated from the water later and then dried before final milling and finishing. Furthermore, when the polymer is agitated with the hot water, adhering solvent and unreacted monomers are released as gases which must be dried and reliquefied before being recycled to the reaction zone. This drying step for the recycle gases presents difficult problems since the gases must be contacted with a solid adsorbent desiccant which must be regenerated from time to time. The solid adsorbent also introduces chemical problems. Activated alumina is frequently used to dry the recycle gas. It converts, in the presence of water, small amounts of methyl chloride to methyl ether which stays in the recycle gases and eventually gets back into the polymerization reactor and thereby severely poisons the polymerization.

2

According to the method disclosed and claimed in copending application Serial No. 645,140, filed February 2, 1946, in the names of Joseph F. Nelson and John H. Bannon, and now abandoned, the use of water for recovering the polymer from the reactants and diluents is obviated by discharging the slurry of polymer in the cold reaction liquid onto a heated surface, which may be a hot plate, heated extruder screws, and the like. In either of the above methods for recovering the polymer from the reaction liquid it has been the practice to first separate the polymer from the bulk of the reactant liquid by filtering through a vibrating screen or the like. However, it has been found in practice that while a large proportion of the polymer particles pass through the screen due to their small size, the tendency of the polymer particles to stick to all surfaces with which they come in contact, causes plugging up of the screen and flow lines. It has also been observed that when the polymer slurry in cold reaction liquid is introduced into the throat of an extruder, it is not possible to obtain any forward motion of the polymer because of the lack of any resistance of the polymer particles to the flights of the extruder due to the unagglomerated condition of the polymer particles.

It is, therefore, the main object of this invention to provide a method for preparing a polymer slurry which is more amenable to further processing.

It is a further object of this invention to provide a method of preparing the polymer slurry by agglomerating the solids to a sufficient particle size so as to facilitate subsequent filtering, the particles being large enough to be retained on a filter.

It is a still further object of this invention to provide a method of preparing the polymer slurry so that the polymer is in a form of large agglomerates or masses from which the reactants can be removed by extruding or by other means.

These and other objects of this invention are accomplished by subjecting the polymer slurry to conditions under which the polymer particles undergo agglomeration whereby the particles do not pass through the interstices of a filtering screen and are large enough to present sufficient surface to enable the slurry to be put through an extruder or other mechanism for removing the reaction liquids.

The agglomeration of the particles can be accomplished in several different ways. One suitable method is by heating the polymer slurry under controlled conditions of agitation until the particles agglomerate. Agitation is necessary to prevent the particles from setting into one or more large masses or lumps.

A convenient method of operating is to add the cold slurry at controlled rates to an agitated diluent maintained at a somewhat higher temperature than the cold slurry. The diluent may be methyl chloride, ethyl chloride, liquid carbon dioxide, isobutylene, a mixture of methyl chloride and isobutylene, slurry which has been previously agglomerated by the heat treatment, or other suitable medium. During this period of agglomeration residual catalyst gets a chance to react to the point of exhaustion. This also helps to stabilize the slurry against excessive agglomeration which is desirable in that polymer which is being formed tends to precipitate out and consequently does not deposit later onto metal surfaces if the polymer is separated by filtering.

After the polymer has been agglomerated to the desired state, it can be readily filtered, i. e. separated from the liquid phase by such means as vibrating screens or vacuum filters or other suitable means, or it can be introduced directly into the mouth of an extruder where volatile materials are flashed off. The agglomerated slurry is also in a state in which it can be readily transferred by means of pipes without plugging the pipes. If desired, surface coating agents may be added to the slurry after the agglomeration step, so as to coat the particles. The coatings act as an additional insurance against the polymer sticking to metal surfaces. The coating agents should be finely divided powders which are insoluble in the liquid medium. Powders, such as zinc stearate, calcium stearate, carbon black, graphite, clay, stearic acid, magnesium oxide, etc. may be used.

Heat agglomeration of the polymer particles may be accomplished by other methods. A heated mixture of the hydrocarbon monomer feed and reaction diluent may be introduced into the slurry as it leaves the reaction vessel to increase the temperature 10° to 50° C. sufficient to cause agglomeration. Similarly steam or other gas may be injected into the slurry to accomplish the same purpose. Heat may also be imparted to the slurry by adding a controlled small amount of catalyst to the slurry which has left the refrigeration reaction zone whereby additional polymerization occurs with the requisite heat liberation. This method is particularly applicable when a high degree of agglomeration is desired in order to produce large lumps or masses of polymer to be further processed in equipment such as extruders. The addition of a normal paraffin hydrocarbon of sufficiently high melting point to solidify in the cold slurry will also liberate sufficient heat of fusion to accomplish the agglomeration which will also be aided by the solid phase resulting. Agglomeration may also be effected by the addition of finished polymer to the slurry. For example the slurry may be introduced into the mouth of an extruder and there mixed with solid recycled from the extruder discharge. This recycle polymer would supply heat for the agglomeration and the small particles in the slurry would tend to adhere to the recycled solid.

Referring to the drawing, which represents one method of carrying out this invention, there is shown a reactor 1 such as described in the patent application of Bannon (U. S. Serial No. 448,575, filed June 26, 1942, and now abandoned). No internal refrigerant is used, all the heat of reaction being transferred through the reactor walls to an external refrigerant. The liquid refrigerant, suitably ethylene, is introduced into the space through line 4. Precooled reactant mixture of iso-olefin and diolefin enters the reactor through line 6. The polymerization mixture desirably consists of from about 60 to 99.5 wt. per cent of an iso-olefin having 4 to 8 carbon atoms per molecule, isobutylene being the preferred material; and from 40 to 0.5 wt. per cent of a diolefin. The diolefin may be butadiene or may be substantially any of the substituted butadienes up to those having from 10 to 12 carbon atoms per molecule. Preferred diolefins are isoprene, piperylene, and dimethyl butadiene. Alternatively, the non-conjugated diolefins, such as dimethylallene, or the triolefins, such as myrcene, having up to 10 or 12 carbon atoms per molecule, may also be used. The polymerization mixture contains in addition from 100 parts to 700 or more parts of a diluent such as methyl chloride, ethyl chloride, methylene chloride, n-butane, isobutane, carbon disulfide, ethylidene difluoride, etc., per 100 parts of the polymerization mixture. However, it is possible to operate without the use of a diluent. The liquid ethylene as external refrigerant cools the mixture to a temperature between —90° C. and —103° C. Catalyst solution is added through line 7 provided with a suitable dispersing nozzle.

The catalyst conveniently consists of a solution of a Friedel-Crafts type catalyst such as boron trifluoride, aluminum bromide, or aluminum chloride in solution in a non-complex-forming, low freezing solvent such as ethyl or methyl chloride or carbon disulfide or other mono-/or poly-halide containing up to 3 or 4 carbon atoms per molecule or other non-complex-forming solvent which is liquid at temperatures below about —30° C. The list of useable Friedel-Crafts catalyst is well shown by N. O. Calloway in his article on "The Friedel-Crafts Synthesis" in the issue of "Chemical Reviews" published for the American Chemical Society at Baltimore in 1935, being volume XVII, Number 3, the article beginning on page 327, the list being particularly well shown on page 375.

The reactant mixture is thoroughly agitated by impeller type agitator 9, so that a circulation of the reacting mixture is produced, for example up through central tube 10 and down through a plurality of peripheral smaller tubes 10A, set between tube sheets 2 and 3. The reaction, if carried out in a halogenated diluent, proceeds promptly to form a slurry of solid polymer particles in the diluent and unreacted olefinic components. In those cases in which no diluent is used the polymer forms as a highly dispersed gel in the cold reactant liquid. When a hydrocarbon, such as n-butane, is used as a diluent, the polymer forms a solution in the hydrocarbon in which case it must be precipitated from solution by suitable means prior to or concomitant with the agglomeration step. The rate of catalyst delivery with respect to the rate of delivery of fresh reactants is preferably adjusted to such a relationship that the proportion of solid polymer in the reacted mixture is less than about 30%. The polymerization reaction being exothermic, heat is liberated as the polymer forms, which is removed by the liquid ethylene in the space between sheets 2 and 3. The reactor is maintained essentially full of liquid, a mixture of relatively finely divided polymer and excess unreacted hydrocarbons plus diluent overflowing from the reactor through line 11 in amount corresponding to the material fed to the reactor through lines 6 and 7 at a velocity of between 1 and 3 ft. per second, discharging into vessel 12 which is maintained at a temperature between about 10° and about 50° C. above the temperature of the incoming slurry. This can be done by surrounding vessel 12 with a jacket 13 into which a liquid which does not freeze at the low temperature employed may be introduced, for example, ethyl chloride, liquefied hydrocarbons and the like. Instead of heating by means of a jacket, a relatively warm diluent stream may be introduced through line 23 into the slurry. The slurry is maintained under slight agitation in order to prevent the polymer from forming a single solid mass, as for example, by stirrer 14. It is especially desirable to control the amount of agglomeration occurring in vessel 12. As pointed out above the polymer should not be allowed to agglomerate into a single slurry or mass. Further than this, it is necessary to prevent the polymer lumps from becoming so large that they will not flow from vessel 12. This can be done by limiting the heat input or by preventing a continuation of the polymerization reaction after the desired agglomeration has taken place. The mixture of agglomerated polymer and cold reaction liquid is then discharged onto a vibrating screen 15 which removes the bulk of the liquid from the polymer. By controlled agglomeration of the polymer before discharging it onto screen 15, the polymer slurry is made filterable and the solid does not pass through the pores of the screen. The filtered polymer is removed from screen 15 directly into an extruder 16 where the polymer is worked by the flights 17. This action of the flights on the agglomerated polymer expresses the bulk of the liquid adhering to the solid, this liquid being withdrawn and recycled to the process through line 21. The extruder also increases the temperature of the polymer and vaporizes any residual volatile material therein. Any such vapors thus produced are recycled to the process through line 22. Excess liquid from the vibrating screen 15 is received in tank 18 provided with inlet 19 for the addition of make up solvent and/or reactants, if desired. The liquid thus recovered in tank 18 may be recycled to reactor 1 through line 20.

As an alternative method of operation the vessel 12, screen 15 and tank 18 may be omitted and the cold slurry in line 11 may be introduced concurrently with a heat-supplying stream from line 24, directly into extruder 16 to give a high degree of agglomeration. In this case the agglomeration can be carried much farther than it could in vessel 12. In fact larger lumps are desirable since they can be picked up more easily by the extruder screw.

The following examples illustrate the effect on polymer particle size when the temperature of the slurry is increased.

Example I 1050 parts by weight of methyl chloride, 215 of isobutylene, and 3.12 of isoprene were cooled externally with liquid ethylene and agitated, while polymerization was effected by the controlled addition of a catalyst consisting of aluminum chloride dissolved in methyl chloride. The catalyst had a concentration of 0.20 g. $AlCl_3$/100 cc. of methyl chloride. 270 parts of the catalyst was used, and the reaction was carried to about 45% conversion. The resulting slurry was a milky dispersion, i. e., the particles of rubber were so small as to be almost indistinguishable with the naked eye. In fact screening tests have shown that much of the polymer is almost microscopic in size.

The temperature of this milky slurry was about −98° C. The temperature was raised to −82° C. while the slurry was mildly agitated. At −82° C. the slurry had agglomerated to soft pea-sized particles in a clear liquor.

Example II

A set of four experiments was run. In each a polymerization was carried out as in Example I to give a milky slurry. In the first two experiments the slurry was filtered at approximately the reaction temperature of −98° C. The slurry was filtered through a 30 mesh screen which had been prechilled with ethylene. In the third and fourth experiments the slurry was mildly agitated and the temperature allowed to rise to −83° C. and to −73° C., respectively, before carrying out the filtration. In each case the slurry agglomerated to larger size particles than in the first two experiments.

The results are given in the following table:

| Run No. | Temperature of Slurry Before Screening °C. | Retained On Screen Percent | Through Screen Percent | Sticking To Screen Percent |
|---|---|---|---|---|
| 1 | −98 | 55 | 38 | 7 |
| 2 | −98 | 55 | 42 | 3 |
| 3 | −83 | 89 | 10 | 1 |
| 4 | −73 | 98.7 | 1.2 | 0.1 |

The results of these experiments show the advantage to be gained by raising the temperature of the slurry. Agitation of reaction slurries at low temperatures has almost no effect on particle size. If anything, particle size is decreased by such agitation.

Example III

A mixture consisting of 397 volumes of isobutylene, 8.1 of isoprene and 945 of methyl chloride was polymerized with a 0.5% $AlCl_3$-methyl chloride catalyst as in Example 1. A very fine slurry, i. e. dispersion of rubber particles in methyl chloride resulted. This slurry which was initially at −99° C., was slowly agitated while the temperature was allowed to slowly rise.

At −76° C. the particles became larger in size, and as the temperature rose to −67° C. the slurry continued to get coarser. At −58° C. the slurry particles had become much larger, but a slurry still existed.

The results of this experiment corroborate the results given in Examples I and II.

The nature and objects of the present invention having been thus fully set forth and specific examples of the same given, what is claimed as new and useful and desired to be secured by Letters Patent is:

1. A polymerization process for copolymerizing a major proportion of isobutylene with a minor proportion of a multiolefin having from 4 to 12, inclusive, carbon atoms per molecule at a temperature within the range between −10° C. and −127° C., by the application thereto of a Friedel-Crafts active metal halide catalyst, comprising the steps in combination of delivering a continuing stream of a major proportion of isobutylene with a minor proportion of the said multiolefin, together with significant amounts of a diluent, to a refrigeration zone and refrigerating said zone to maintain therein a polymerization temperature within the stated range, together with a continuing stream of a fluid Friedel-Crafts active metal halide catalyst to produce a desired copolymer, simultaneously delivering an overflow stream of finely divided solid copolymer particles in the form of a slurry in diluent and unpolymerized olefins from said polymerization zone to an agglomeration zone, and increasing the temperature of the slurry in said agglomeration zone under agitation by from 10° to 50° C. so as to form larger particles of polymer as a slurry in the diluent and unreacted monomers.

2. A polymerization process for copolymerizing a major proportion of isobutylene with a minor proportion of isoprene at a temperature within the range between −10° C. and −127° C., by the application thereof of a Friedel-Crafts active metal halide catalyst, comprising the steps in combination of delivering a continuing stream of a major proportion of isobutylene with a minor proportion of the said isoprene, together with significant amounts of a diluent, to a refrigeration zone and refrigerating said zone to maintain therein a polymerization temperature within the stated range, together with a continuing stream of a fluid Friedel-Crafts active metal halide catalyst to produce a desired copolymer, simultaneously delivering an overflow stream of finely divided solid copolymer particles in the form of a slurry in diluent and unpolymerized olefins from said polymerization zone to an agglomeration zone, and increasing the temperature of the slurry in said agglomeration zone under agitation by from 10° to 50° C. so as to form larger particles of polymer as a slurry in the diluent and unreacted monomers.

3. A polymerization process for copolymerizing a major proportion of isobutylene with a minor proportion of butadiene at a temperature within the range between −10° C. and −127° C., by the application thereof of a Friedel-Crafts active metal halide catalyst, comprising the steps in combination of delivering a continuing stream of a major proportion of isobutylene with a minor proportion of the said butadiene, together with significant amounts of a diluent, to a refrigeration zone and refrigerating said zone to maintain therein a polymerization temperature within the stated range, together with a continuing stream of a fluid Friedel-Crafts active metal halide catalyst to produce a desired copolymer, simultaneously delivering an overflow stream of finely divided solid copolymer particles in the form of a slurry in diluent and unpolymerized olefins from said polymerization zone to an agglomeration zone, and increasing the temperature of the slurry in said agglomeration zone under agitation by from 10° to 50° C. so as to form larger particles of polymer as a slurry in the diluent and unreacted monomers.

4. A polymerization process for copolymerizing a major proportion of isobutylene with a minor proportion of a multiolefin having from 4 to 12, inclusive, carbon atoms per molecule at a temperature within the range between −10° C. and −127° C., by the application thereto of a Friedel-Crafts active metal halide catalyst, comprising the steps in combination of delivering a continuing stream of a major proportion of isobutylene with a minor proportion of the said multiolefin, together with significant amounts of a diluent comprising methyl chloride, to a refrigeration zone and refrigerating said zone to maintain therein a polymerization temperature within the stated range, together with a continuing stream of a fluid Friedel-Crafts active metal halide catalyst in methyl chloride, to produce a desired copolymer, simultaneously delivering an overflow stream of finely divided solid copolymer particles in the form of a slurry in diluent and unpolymerized olefins from said polymerization zone to an agglomeration zone, and increasing the temperature of the slurry in said agglomeration zone under agitation by from 10° to 50° C. so as to form larger particles of polymer as a slurry in the diluent and unreacted monomers.

5. A polymerization process for copolymerizing a major proportion of isobutylene with a minor proportion of a multiolefin having from 4 to 12, inclusive, carbon atoms per molecule at a temperature within the range between −10° C. and −127° C., by the application thereto of a Friedel-Crafts active metal halide catalyst, comprising the steps in combination of delivering a continuing stream of a major proportion of isobutylene with a minor proportion of the said multiolefin, together with significant amounts of a diluent comprising methyl chloride, to a refrigeration zone and refrigerating said zone to maintain therein a polymerization temperature within the stated range, together with a continuing stream of a fluid Friedel-Crafts active metal halide catalyst comprising a solution of aluminum chloride in methyl chloride, to produce a desired copolymer, simultaneously delivering an overflow stream of finely divided solid copolymer particles in the form of a slurry in diluent and unpolymerized olefins from said polymerization zone to an agglomeration zone, and increasing the temperature of the slurry in said agglomeration zone under agitation by from 10° to 50° C. so as to form larger particles of polymer as a slurry in the diluent and unreacted monomers.

JOSEPH F. NELSON.
BRUCE R. TEGGE.

REFERENCES CITED

The following references are of record in the file of this patent:

UNITED STATES PATENTS

| Number | Name | Date |
|---|---|---|
| 2,401,754 | Green | June 11, 1946 |
| 2,405,480 | Wilde | Aug. 6, 1946 |